(12) United States Patent
Mizobata et al.

(10) Patent No.: US 9,283,877 B2
(45) Date of Patent: Mar. 15, 2016

(54) MOVABLE HEADREST

(71) Applicant: TOYOTA BOSHOKU KABUSHIKI KAISHA, Aichi-ken (JP)

(72) Inventors: Hiroshi Mizobata, Seto (JP); Jun Fukami, Miyoshi (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/606,346

(22) Filed: Jan. 27, 2015

(65) Prior Publication Data
US 2015/0210191 A1  Jul. 30, 2015

(30) Foreign Application Priority Data
Jan. 29, 2014  (JP) .................. 2014-014150

(51) Int. Cl.
*B60N 2/42* (2006.01)
*B60N 2/427* (2006.01)
*B60R 21/055* (2006.01)
*B60N 2/48* (2006.01)

(52) U.S. Cl.
CPC ............ *B60N 2/4811* (2013.01); *B60N 2/4823* (2013.01); *B60N 2/4885* (2013.01); *B60N 2002/4894* (2013.01)

(58) Field of Classification Search
CPC .. B60N 2/4811; B60N 2/4823; B60N 2/4885; B60N 2002/4894
USPC ............................................. 297/216.12, 410
See application file for complete search history.

(56) References Cited

U.S. PATENT DOCUMENTS

| | | | | |
|---|---|---|---|---|
| 5,961,182 A * | 10/1999 | Dellanno | ............. | B60N 2/4228 297/216.12 |
| 6,213,548 B1 * | 4/2001 | Van Wynsberghe | . | B60N 2/4864 297/216.12 X |
| 6,779,839 B2 * | 8/2004 | Andreasson | ......... | B60N 2/3011 297/410 X |
| 7,048,334 B2 * | 5/2006 | Pal | ....... | B60N 2/4279 297/216.12 |
| 7,090,292 B2 * | 8/2006 | Dellanno | ........... | B60N 2/42709 297/216.12 |
| 8,469,445 B2 * | 6/2013 | Hertl | ........................ | B60N 2/48 297/216.12 |
| 8,657,378 B2 * | 2/2014 | Kunert | .................. | B60N 2/4814 297/391 |
| 2009/0315372 A1 * | 12/2009 | Tracht | ................... | B60N 2/4885 297/216.12 |

FOREIGN PATENT DOCUMENTS

JP  2013-169945  9/2013

* cited by examiner

*Primary Examiner* — Rodney B White
(74) *Attorney, Agent, or Firm* — Greenblum & Bernstein, P.L.C.

(57) ABSTRACT

A movable headrest includes a base member including a headrest stay; a movable member that is slidable relative to the headrest stay; and a lock mechanism that locks the movable member such that the movable member is restrained from sliding relative to the headrest stay. The movable member includes a flexure part that bends due to a load received from a head of an occupant, a frame part that supports the flexure part, and an engaging portion. The frame part includes a sliding portion that slides relative to the headrest stay, and when the flexure part is bent such that the engaging portion is moved relative to the frame part, the movable member is unlocked.

5 Claims, 15 Drawing Sheets

MOVABLE HEADREST

INCORPORATION BY REFERENCE

The disclosure of Japanese Patent Application No. 2014-014150 filed on Jan. 29, 2014 including the specification, drawings and abstract is incorporated herein by reference in its entirety.

BACKGROUND OF THE INVENTION

1. Field of the Invention

The present invention relates to a headrest. More particularly, the present invention relates to a movable headrest which is used for a seat for a conveyance and is improved so as to suppress occurrence of whiplash.

2. Description of Related Art

Conventionally, it is widely known to employ a headrest for a seat for a conveyance. It is also known to provide a movable headrest by combining a portion that is fixed to a seat back and a portion that can be moved upward and downward relative to the seat back (Japanese Patent Application No. 2013-169945). With a headrest having the structure described in JP 2013-169945A, it is possible to suppress occurrence of whiplash even if the head of an occupant moves in the upper-lower direction relative to the headrest when the rear side of a conveyance is hit (in other words, when a rear collision occurs), because a part of the headrest moves in accordance with the behavior of the head of the occupant.

However, there is still room for improvement in the technology described in JP 2013-169945A. In the technology described in JP 2013-169945A, unless the entire movable member is shifted rearward, the locking is not released and the upward/downward movement is not allowed. Further, in the configuration described in JP 2013-169945A, a member that prevents movement of the movable member relative to a base member is disposed in a space in a portion that is substantially recessed in a sectional view and that is provided in the base member or the movable member. Therefore, the locking is not released unless this member is pushed away, and as a result of pushing this member away to release the locking, a relatively large clearance is formed in the front-rear direction. Thus, backlash of the movable member may occur.

SUMMARY OF THE INVENTION

The present invention provides a movable headrest which is normally locked so as not to be moved upward and downward, and in which backlash of a movable member is suppressed when the headrest slides.

A movable headrest according to an aspect of the present invention includes a base member including a headrest stay; a movable member that is slidable in at least one of an upward direction and a downward direction relative to the headrest stay; and a lock mechanism that locks the movable member such that the movable member is restrained from sliding relative to the headrest stay. The movable member includes a flexure part that bends due to a load received from a head of an occupant, a frame part that supports the flexure part, and an engaging portion that engages with the base member such that the movable member is locked. The frame part includes a sliding portion that slides relative to the headrest stay, and when the flexure part is bent such that the engaging portion is moved relative to the frame part, the movable member is unlocked.

According to the above-described aspect, when the flexure part, which is provided at a position different from the position of the sliding portion, is bent such that the engaging portion is moved relative to the frame part, the movable member is unlocked. Thus, it is possible to avoid a situation in which a large clearance is formed between the headrest stay and the sliding portion. Therefore, it is possible to suppress occurrence of backlash of the movable member when the movable member moves.

In the above-described aspect, rigidity of the sliding portion may be higher than rigidity of the flexure part.

According to the above-described aspect, since the rigidity of the sliding portion is higher than the rigidity of the flexure part, the sliding portion can be kept from bending (i.e., can be maintained in an unbent state) when the flexure part bends. Therefore, it is possible to prevent the smooth sliding from being hindered.

In the above-described aspect, the movable headrest may further include an urging part that urges the movable member toward an initial position, after the movable member is moved from the initial position.

According to the above-described aspect, when the movable member moves from the initial position, the urging force toward the initial position acts. Therefore, the effort required to return the movable member to the initial position can be saved and/or the movable member can be returned to the engagement.

According to the above-described aspect of the present invention, it is possible to provide the movable headrest which is normally locked so as not to be moved upward and downward, and in which occurrence of backlash' of the movable member is suppressed when the headrest slides.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
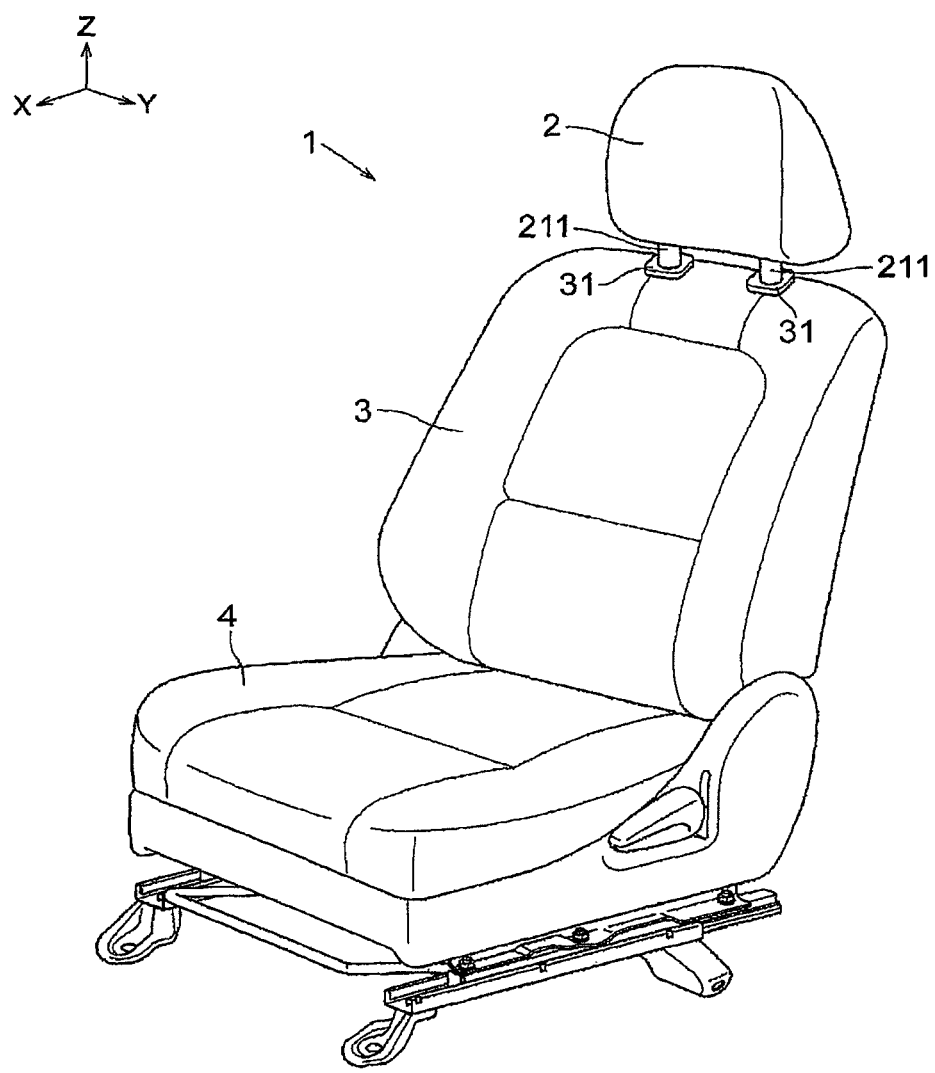
FIG. 1 is a perspective view of a seat for a conveyance to which a movable headrest of the present invention is applied.

In the following, embodiments of the present invention will be described with reference to the drawings as necessary. The directions in this specification, such as the front-rear direction, the upper-lower direction, and the right-left direction, are defined based on the X, Y, and Z directions indicated in, for example, FIG. 1. The X direction is the forward direction, the Y direction is the leftward direction, and the Z direction is the upward direction. For example, in general, the front side is the side that comes into sight when an occupant is seated on a seat 1 provided with a headrest 2, and the rear side is the side on which the back of the occupant's head is located, and which does not come into sight.

The headrest 2 in this embodiment is applied to the seat 1 for a conveyance, and more particularly to the seat 1 for a vehicle. The seat 1 includes a seat cushion 4 that has a support surface that mainly faces the thighs of the occupant; a seat back 3 that can be tilted relative to the seat cushion 4 and has a support surface that mainly faces the back of the occupant; and the headrest 2 that is connected with the seat back 3 and mainly faces the head PH of the occupant.

The headrest 2 includes a base member 21 connected with the seat back 3 and fixed at a predetermined position, and a movable member 22 slidably mounted on the base member 21. The headrest 2 also includes a lock mechanism that is able to bring the movable member 22 to a locked state such that the movable member 22 is restrained from sliding relative to the base member 21, and an unlocked state in which the locking is released (i.e., the lock mechanism locks the movable member 22 such that the movable member 22 is restrained from sliding relative to the base member 21, and the lock mechanism unlocks (releases) the movable member 22).

The base member 21 includes a headrest stay 211, and a bracket 212 fixed to the headrest stay 211. The headrest stay 211 includes rod-shaped portions and the upper parts of the rod-shaped portions are coupled with each other by a portion extending in the width direction, and the lower parts of the rod-shaped portions of the headrest stay 211 have two respective free ends. The headrest stay 211 is fixed by inserting the free ends into headrest holders 31 provided in the seat back 3. The movable member 22 is slidable relative to the headrest stay 211, and includes sliding portions 224 that are slidable relative to the headrest stay 211. In order to restrain free movement of the movable member 22 relative to the base member 21, the movable member 22 is provided with an engaging portion 223 that engages with the base member 21. The engaging portion 223 is provided on a flexure part 222 of the movable member 22, and the flexure part 222 is supported by a frame part 221. The frame part 221 forms the framework of the movable member 22, and performs the function of supporting the parts of the movable member 22 other than the frame part 221. The sliding portions 224 are included in this frame part 221. In this embodiment, the sliding portions 224 are formed as portions of the frame part 221 and have sufficient rigidity.

In the headrest 2 of this embodiment, when the head PH of the occupant hits against the support surface of the headrest 2 upon a rear collision, the flexure part 222 bends and causes the engaging portion 223 to shift relative to the frame part 221. Accordingly, the engaging portion 223 is disengaged from the base member 21. In this specification, the state in which the engaging portion 223 is engaged with the base member 21 and the movement of the movable member 22 is restrained will be referred to as an initial state, and the position of the movable member 22 in the initial state will be referred to as an initial position.

Figure 2:
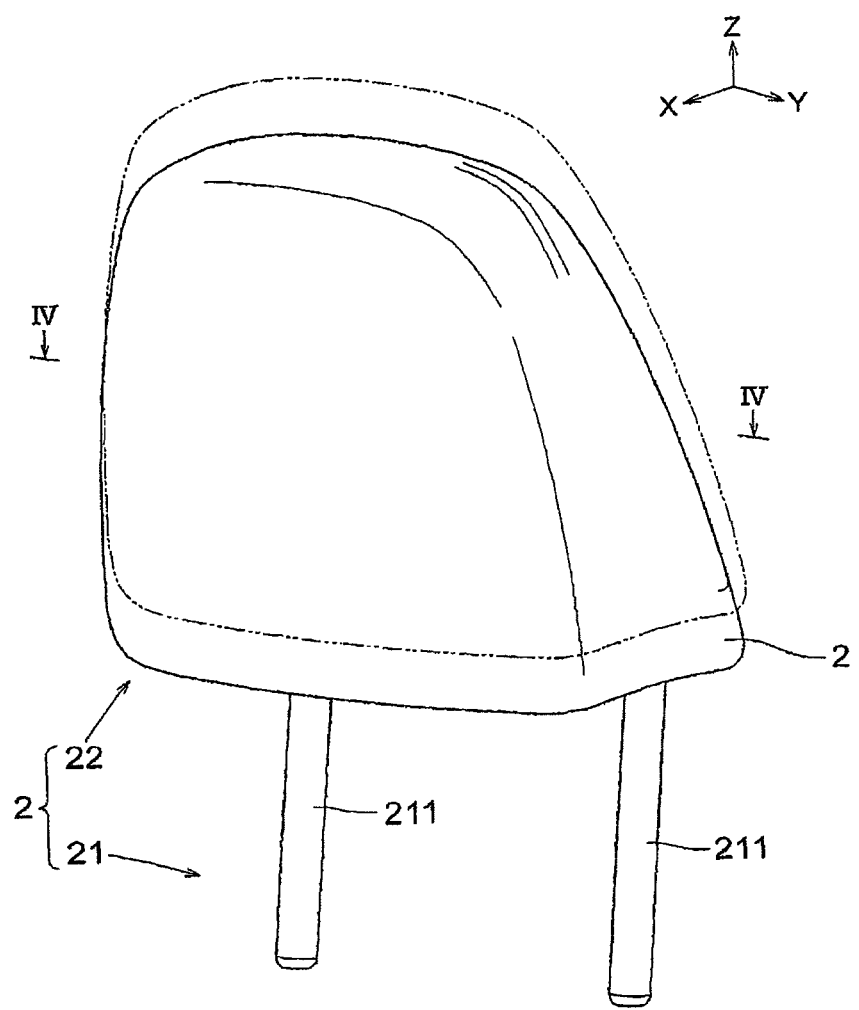
FIG. 2 is a perspective view showing the internal structure of the headrest of an embodiment.

In the headrest 2 of this embodiment, when the headrest 2 is released from the engagement, the movable member 22 can move upward from the initial position relative to the base member 21. For example, when the headrest 2 is locked, the movable member 22 is located as indicated by the solid line in FIG. 2, and when there is a force acting toward the upper side so as to release the locking, the movable member 22 is allowed to be located as indicated by the two-dot chain line in FIG. 2. In FIG. 2, the state indicated by the solid line is the state in which the movable member 22 is located at the initial position. The movable member 22 includes a pad member 75 and a cover 76 so as to cover the frame part 221 and the like. An elastic urethane foam, which is a member commonly used for the seat 1 for a conveyance, is used for the pad member 75. A flexible fabric material is used for the cover 76.

Figure 3:
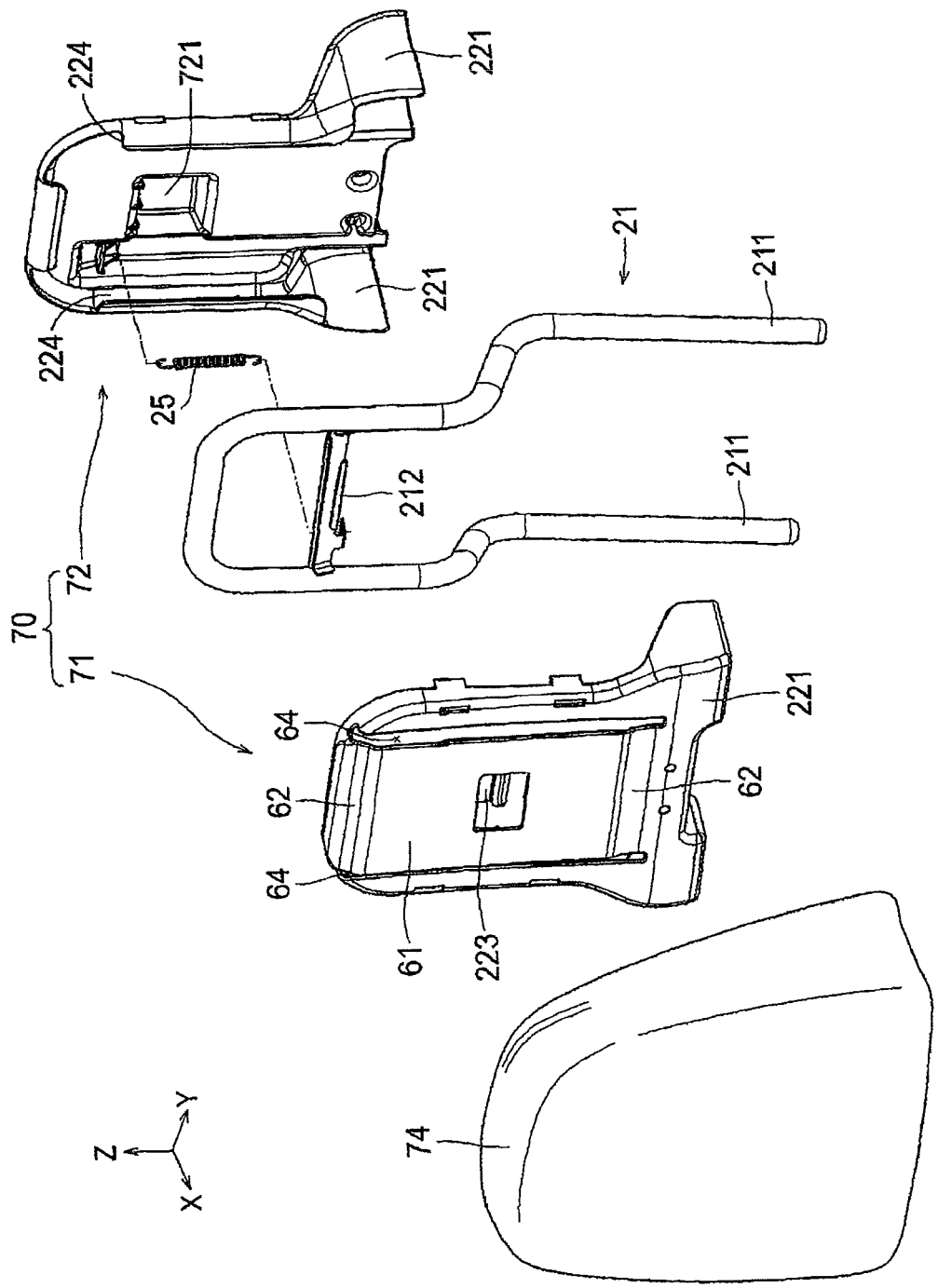
FIG. 3 is an exploded perspective view of the headrest of the embodiment.
Figure 4:
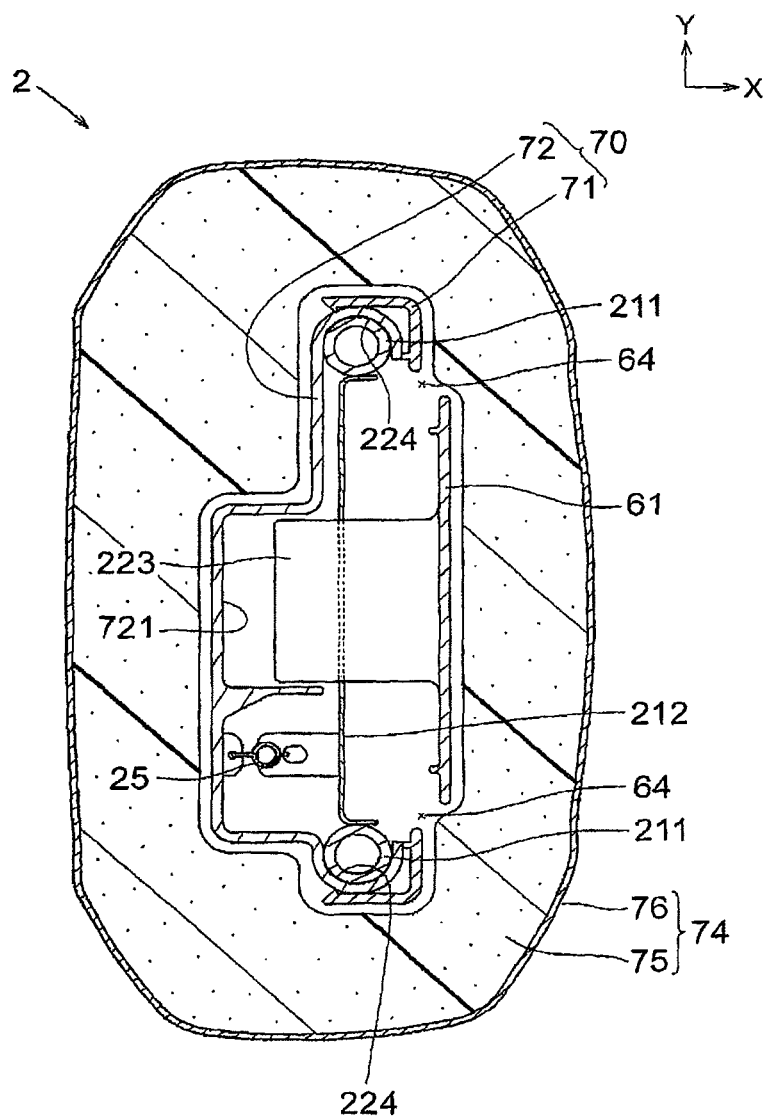
FIG. 4 is a sectional view taken along the line IV-IV of FIG. 2.

Next, the headrest 2 of the embodiment will be described in detail. As shown in FIG. 2, the upper part of the headrest stay 211 is covered with the movable member 22. As shown in FIG. 3 and FIG. 4, the movable member 22 includes a resin case part 70 that can be divided into a front-side case 71 and a rear-side case 72, and a covering part 74 with which the case part 70 can be covered. The covering part 74 includes the elastic pad member 75 that is an elastic urethane foam, and the cover 76 located outside the pad member 75. In the embodiment, the case part 70 includes the frame part 221 and the flexure part 222, and includes the sliding portions 224 that are provided in a part of the rear-side case 72 and are slidable relative to the headrest stay 211. The sliding portions 224 are slidable relative to portions of the headrest stay 211, which extend in the upper-lower direction, and the sliding portions 224 can slide while remaining adjacent to the headrest stay 211. The sliding portions 224 are formed so as to extend along the outer peripheral surfaces of the headrest stay 211, and the headrest stay 211 is fitted into portions that are recessed in a lateral sectional view.

In the embodiment, the flexure part 222 is provided in the front-side case 71 that is connected with the rear-side case 72. The flexure part 222 is provided at the substantially center of the front-side case 71. Slits 64 are located on the right and left sides of a plate-shaped pressure receiving surface 61, and flexible parts 62 are located on the upper and lower sides of the pressure receiving surface 61. This configuration allows shift of the pressure receiving surface 61. In other words, the part defined by the slits 64 and the flexible parts 62 is the pressure receiving surface 61. While this pressure receiving surface 61 itself does not deform significantly, the pressure receiving surface 61 is allowed to shift, since the slits 64 and the flexible parts 62 are formed. In the embodiment, the flexure part 222 is formed by (constituted by) the flexible parts 62 and the pressure receiving surface 61. In the embodiment, the flexible parts 62 have a bent shape in a sectional view and are thinner than the pressure receiving surface 61 such that the flexible parts 62 are easily deformed. The means for securing the flexibility of the flexible parts 62 is not limited to the combination of the bent shape and the thickness, and the flexibility can also be secured through the shape alone or through the thickness alone. It is also possible to secure the flexibility by using a material softer than the frame part 221 as the material for the flexible parts 62. Specifically, an elastomer resin can be employed as the soft material.

In the embodiment, the engaging portion 223 formed by (constituted by) a hook that is substantially J-shaped in a sectional view is provided on the flexure part 222 of the front-side case 71. This engaging portion 223 engages with the bracket 212 that is fixed to the headrest stay 211 to extend from one of the rod-shaped portions of the headrest stay 211 to the other of the rod-shaped portions of the headrest stay 11, and the movement of the movable member 22 relative to the base member 21 can be restrained when the bracket 212 and the engaging portion 223 engage with each other. That is, the lock mechanism is formed by (constituted by) the engaging portion 223 provided on the flexure part 222 and the bracket 212 fixed to the headrest stay 211. The rear-side case 72 includes a recessed part 721 that can restrict the moving direction of the engaging portion 223, and the engaging portion 223 is disengaged from the bracket 212 when the engaging portion 223 moves toward the rear side along the recessed part 721. Once the engaging portion 223 is disengaged from the bracket 212, the movable member 22 is no longer restrained from sliding relative to the base member 21, and the movable member 22 is allowed to slide. In the state in which the movable member 22 is allowed to slide, when the base member 21 moves downward with the height position of the head PH of the occupant remaining substantially the same, or the head PH of the occupant moves upward with the height position of the base member 21 remaining substantially the same, the movable member 22 moves upward relative to the base member 21.

The headrest 2 of this embodiment includes a spring 25 that is an elastic member. This spring 25 has one end connected with the base member 21 and the other end connected with the movable member 22, and when the movable member 22 shifts upward from the initial position, the spring generates an urging force trying to return the movable member 22 toward the initial position. In this embodiment, the one end of the spring 25 is connected with the bracket 212 fixed to the headrest stay 211. The spring 25 is selected such that the urging force is appropriately provided. The urging force does not prevent the movable member 22 from moving upward along with the head PH of the occupant moving upward. When the head PH of the occupant moves away from the movable member 22, the spring 25 urges the movable member 22 such that the movable member 22 can be returned to the initial position, namely, the engaging portion 223 and the bracket 212 can be engaged with each other.

Figure 5:
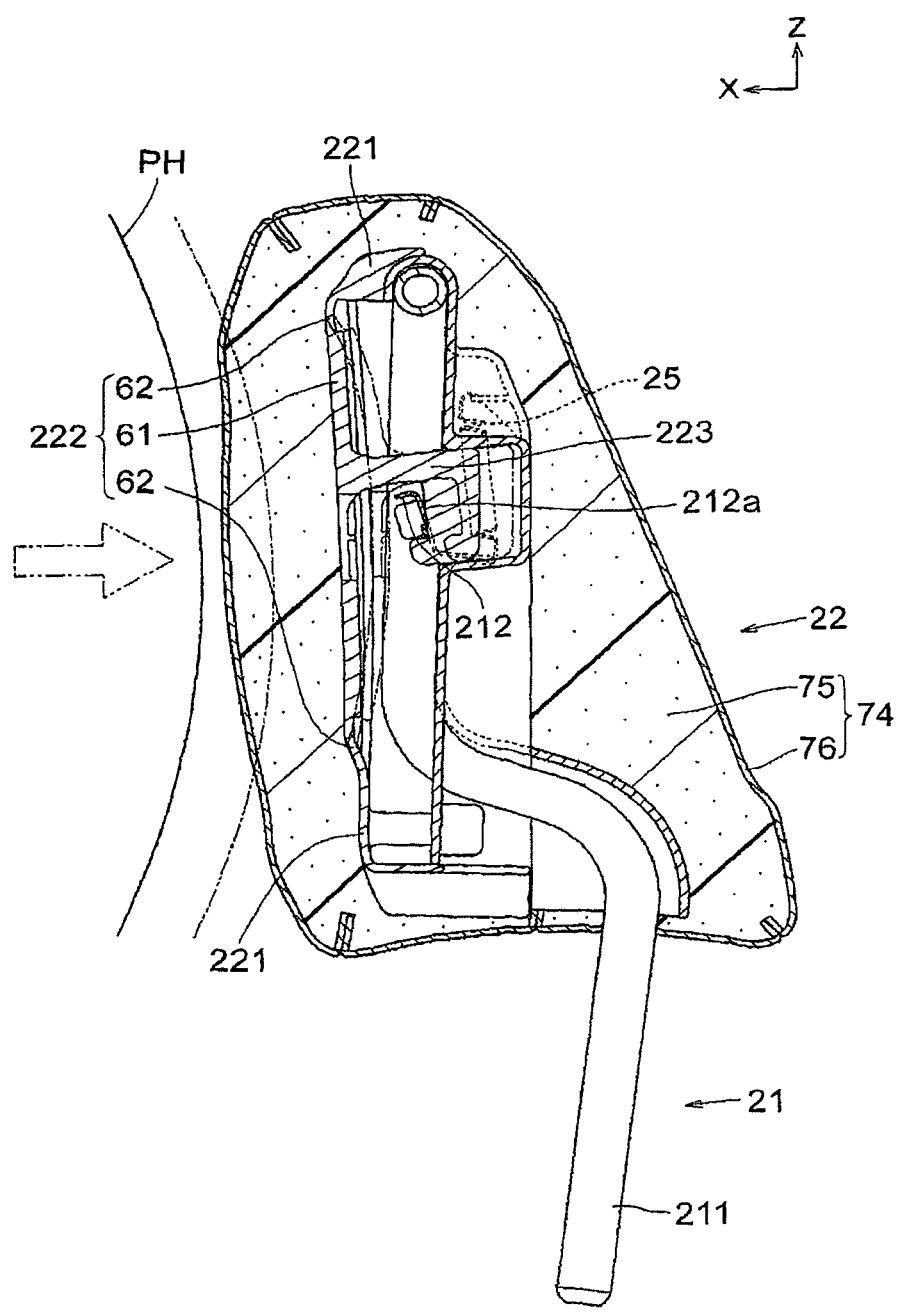
FIG. 5 is a longitudinal sectional view showing the initial state of the headrest of the embodiment.
Figure 6:
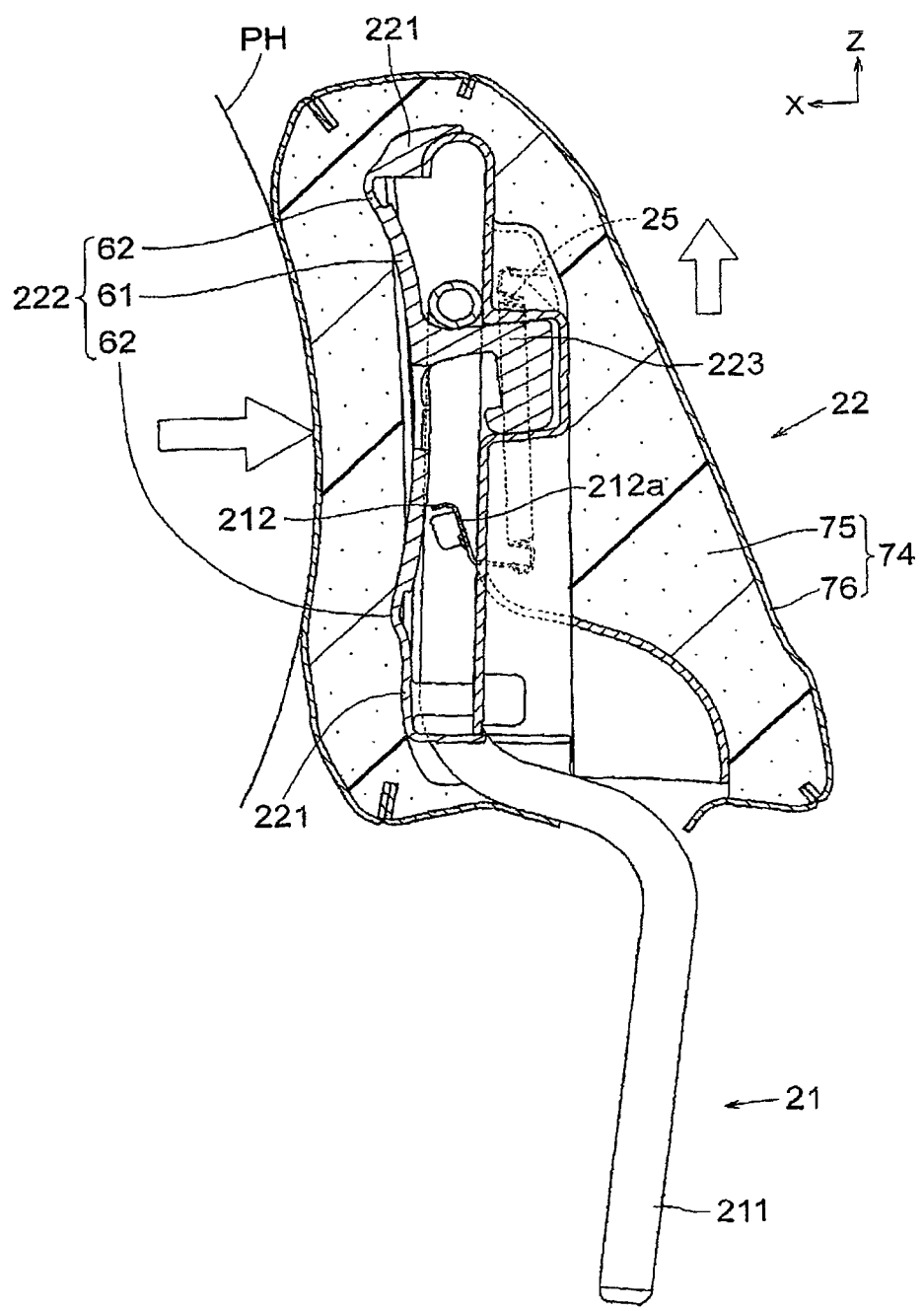
FIG. 6 is a longitudinal sectional view showing a state in which a movable member of the headrest of the embodiment has moved to the uppermost position from the initial state.

Next, how the movable member 22 of the headrest 2 of the embodiment shifts will be described. The normal state in which the head PH of the occupant is not in contact with the headrest 2 is the state indicated by the solid line in FIG. 5. This is the state in which the engaging portion 223 included in the movable member 22 is engaged with the bracket 212 provided in the base member 21, and this is the locked state in which movement of the movable member 22 relative to the base member 21 is restrained. The position of the movable member 22 in this state is the initial position. When a load equal to or larger than a predetermined value is applied from the head PH of the occupant to the support surface of the movable member 22, the flexure part 222 of the movable member 22 bends toward the rear side as indicated by the two-dot chain line in FIG. 5. Accordingly, the engaging portion 223 provided on the back surface side of the flexure part 222 shifts toward the rear side and the engaging portion 223 is disengaged from the bracket 212, so that the movable member 22 is allowed to move relative to the base member 21. Meanwhile, the engaging portion 223 enters the recessed part 721, and the amount of rearward shift of the flexure part 222 is controlled. When a force for shifting the movable member 22 upward acts on the movable member 22 in this state, the movable member 22 moves upward. The upward movement of the movable member 22 is not unlimited. The state in which the upper surface of the engaging portion 223 is in contact with the headrest stay 211 as shown in FIG. 6 is the state in which the movable member 22 is located at the uppermost position relative to the base member 21. In this state, the spring 25 connected with the base member 21 and the movable member 22 is extended most. As a force trying to restore the extended spring 25 to its original state acts, the engagement between the engaging portion 223 and the bracket 212 as indicated by the solid line in FIG. 5 is achieved via a state in which the engaging portion 223 contacts the bracket 212 as shown in FIG. 7.

Figure 7:
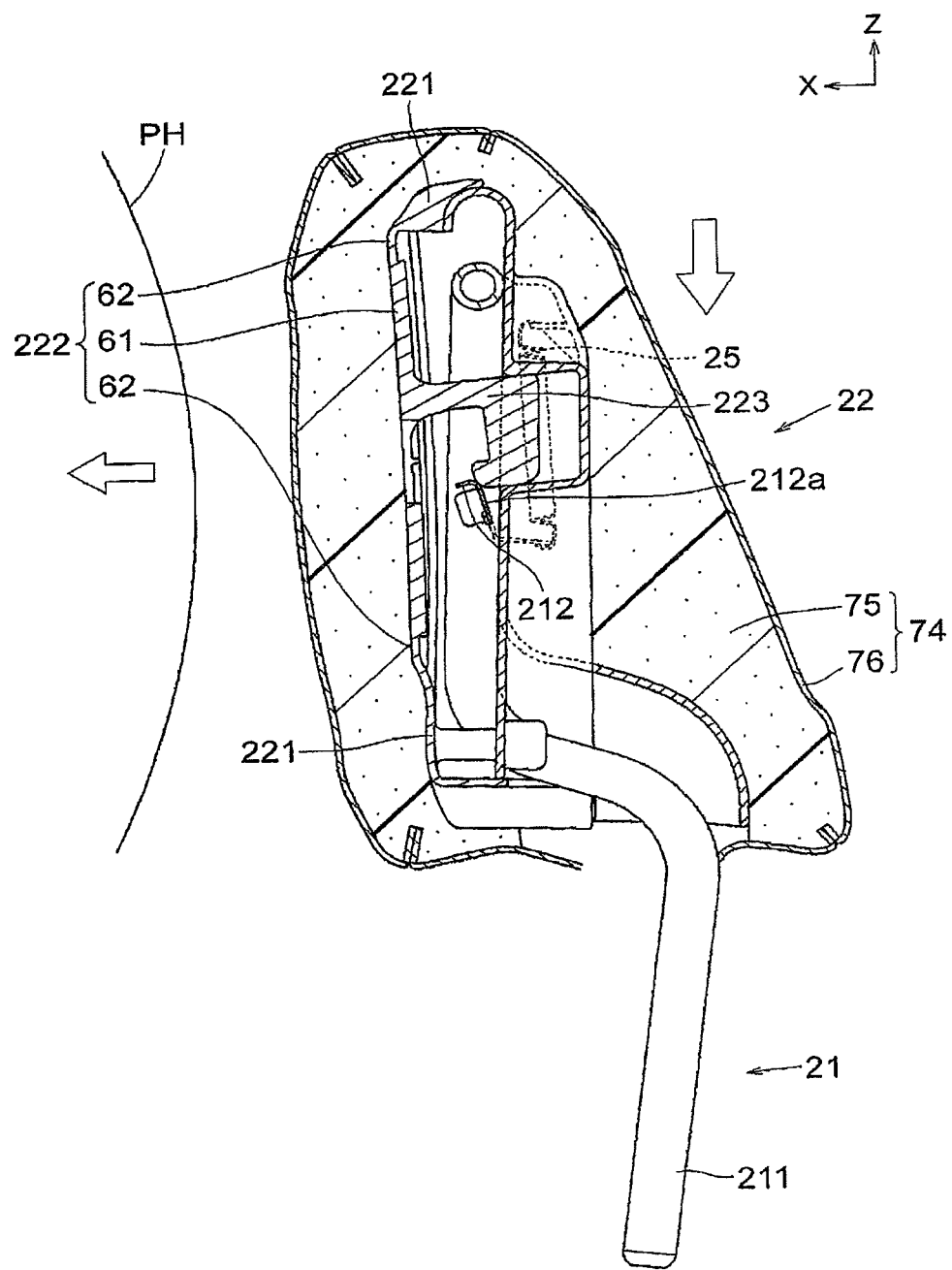
FIG. 7 is a longitudinal sectional view showing a state in which the movable member of the headrest of the embodiment is returning to the initial state, after being moved to the upper side.

FIG. 7 shows a state in which the head PH of the occupant is away from the headrest 2, and this state is the state in which the engaging portion 223 is located on the front-end side. In this state, the engaging portion 223 is in contact with an inclined surface 212a provided in the bracket 212. Therefore, when a force acts so as to move the engaging portion 223 downward, the engaging portion 223 moves downward along this inclined surface 212a. When the movable member 22 is pushed down to a predetermined position, the hook that is the engaging portion 223 can move forward and be fitted onto the bracket 212, that is, the engagement is achieved. The hook moves forward due to the force with which the pressure receiving surface 61, released from the pressing force of the head PH, returns to a predetermined position.

Even if the urging force of the spring 25 is not provided, the movable member 22 shifts downward by gravity. However, if the force for shifting the movable member 22 is the gravity alone, only the state as shown in FIG. 7 can be achieved and the engagement between the engaging portion 223 and the bracket 212 cannot be achieved. However, in this state as well, it is possible to engage the engaging portion 223 and the bracket 212 with each other as shown in FIG. 5 by pushing the movable member 22 of the headrest 2 from the upper side to the lower side.

Next, the method of manufacturing the headrest 2 of the embodiment will be briefly described with reference to FIG. 3. The bracket 212 is fixed by welding to the headrest stay 211 formed by bending a columnar metal. The rear-side case 72, which is formed in advance using polyacetal, is fitted to the headrest stay 211 while sliding the rear-side case 72 from the upper side toward the lower side. The spring 25 is attached so as to couple the rear-side case 72 and the bracket 212 with each other. Then, the front-side case 71 formed using polyacetal is fitted and fixed to the rear-side case 72. The covering part 74 is mounted such that the case part 70 formed by (constituted by) the front-side case 71 and the rear-side case 72 is covered with the covering part 74. Thus, the headrest 2 is completed.

In the headrest 2 of the embodiment, the locking can be released (the movable member 22 is unlocked) when the flexure part 222, which is provided at a position different from the positions of the sliding portions 224, is bent such that the engaging portion 223 is moved relative to the frame part 221. Therefore, it is possible to avoid a situation in which a large clearance is formed between the headrest stay 211 and the sliding portions 224. Accordingly, it is possible to suppress occurrence of backlash of the movable member 22 when the movable member 22 moves. Since the locking can be released by bending the flexure part 222 provided at a position away from the sliding portions 224, it is possible to suppress occurrence of backlash of the movable member 22 when the movable member 22 moves. Since the rigidity of the sliding portions 224 is higher than the rigidity of the flexure part 222, the sliding portions 224 can be kept from bending (i.e., can be maintained in an unbent state) when the flexure part 222 bends. Therefore, it is possible to prevent the smooth sliding from being hindered. When the movable member 22 moves from the initial position, the urging force toward the initial position acts, and therefore, the effort required to return the movable member 22 to the initial position is saved.

In the headrest 2 of the embodiment, since the slits 64 extending in the upper-lower direction are provided, it is possible to provide the large pressure receiving surface 61 as well as to make a bending amount relatively large. Furthermore, since the pad member 75 and the cover 76 can be integrated with the case part 70 by integral molding, it is possible to increase the options for the outer shape of the headrest 2. It is also possible to reduce the number of parts, because excessive upward movement of the movable member 22 can be prevented by a part of the headrest stay 211.

When the movable member 22 moves upward, the force of the spring 25 trying to return the movable member 22 to the initial position acts, and therefore, the effort required to engage the movable member 22 can be saved. Even when the engaging portion 223 and the bracket 212 fail to be engaged through the urging force applied by the spring 25, it is possible to engage the engaging portion 223 with the bracket 212 by applying a load so as to push the movable member 22 from the upper side of the headrest 2 toward the lower side, and it is thus relatively easy to return the engaging portion 223 and the bracket 212 to the engaged state.

Since the headrest stay 211 is held between the sliding portions 224 provided in the right-left direction of the rear-side case 72, it is possible to suppress backlash of the movable headrest 2. Since the flexure part 222 is provided in the front-side case 71 that is provided separately from the rear-side case 72, it is possible to separately provide a portion where the rigidity should be increased and a portion where the rigidity should be lowered, relatively easily. Furthermore, since the sliding portions 224 are formed using a polyacetal resin, which is a resin having high rigidity and low sliding resistance, it is possible to smoothly slide the sliding portions 224 and the headrest 2.

Modified Example 1

Figure 8:
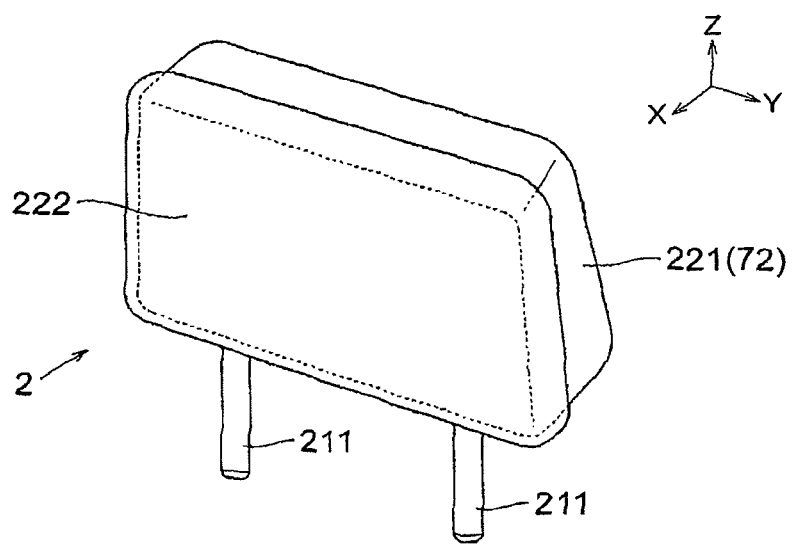
FIG. 8 is a perspective view of a headrest of a modified example, which does not include a case on the front-side.
Figure 9:
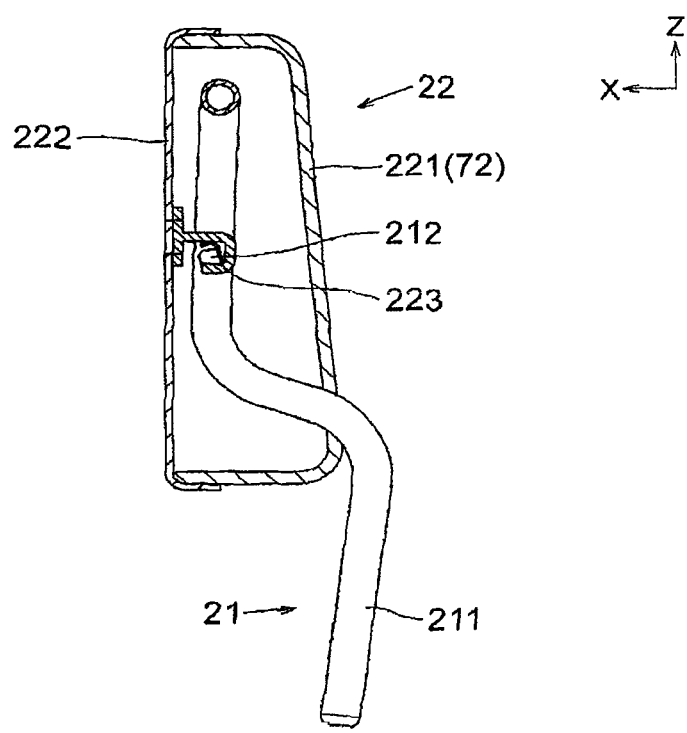
FIG. 9 is a conceptual view showing the longitudinal section of the headrest in which a planar body is attached to the front side of a rear-side case.

In Modified example 1, a configuration that is generally the same as the embodiment is employed. Unlike the embodiment, however, the front-side case 71 is not provided, and a bendable member is attached to the front side of the rear-side case 72 of the movable member 22 (see FIG. 8 to FIG. 10). In the case of the modified example, the rear-side case 72 is the frame part 221, and the flexure part 222 is formed by (constituted by) a member attached to the rear-side case 72. Also in this modified example, the engaging portion 223 is allowed to shift to the rear side by being subjected to a load equal to or larger than a predetermined value from the head PH of the occupant. Specifically, as shown in FIG. 9, a hook that is the engaging portion 223 can be attached to the back surface side of a planar body such as a rubber or a net. In this configuration, the covering part 74 similar to that of the embodiment may be omitted, but it is also possible to provide the covering part 74 similar to that of the embodiment.

Figure 10:
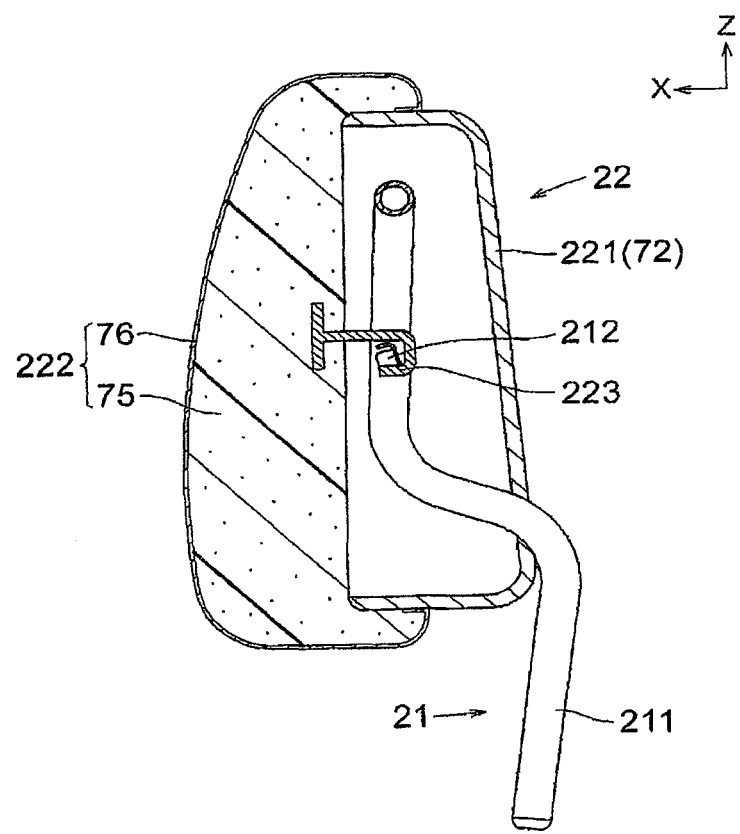
FIG. 10 is a conceptual view showing the longitudinal section of the headrest in which the front side of the rear-side case is covered with a pad member and a cover.

As shown in FIG. 10, the pad member 75 and the cover 76 can also be used as the bendable member. In this case, since the pad member 75 and the cover 76 are used in the same manner as the manner in which the covering part 74 is used, it is not necessary to provide the covering part 74. Since the pad member 75 is used, it is also possible to integrally mold the pad member 75 and the hook constituting the engaging portion 223. In other words, as shown in FIG. 10, a part of the engaging portion 223 may be located inside the flexure part 222.

Modified Example 2

Figure 11:
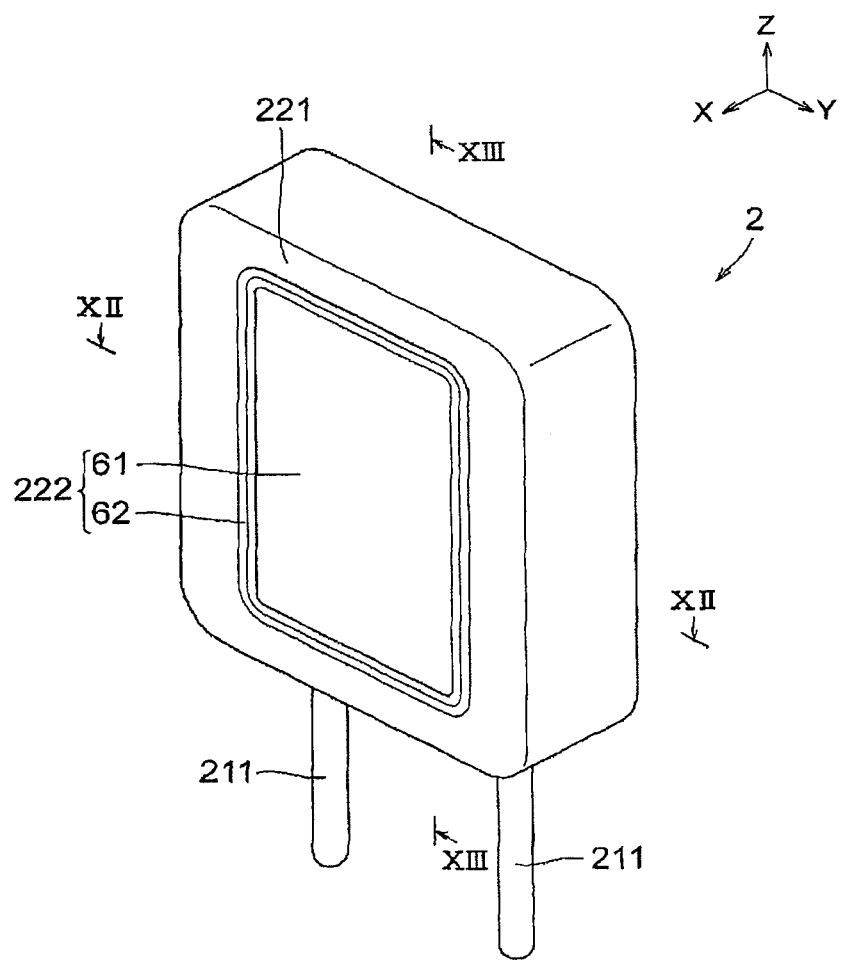
FIG. 11 is a perspective view of a headrest of Modified example 2, in which a flexible part is constituted by a plurality of continuous ridges and valleys.

In Modified example 2, unlike the embodiment, the flexure part 222 is formed without forming slits when the flexure part 222 is formed of a resin such as polyacetal that is higher in rigidity than rubber and the like. For example, as shown in FIG. 11, a part of the portion located ahead of the headrest stay 211 is bent multiple times into an accordion shape so as to be separated from the other region. In this case, the portion bent into an accordion shape is the flexible part 62, and the outer periphery of the pressure receiving surface 61 is formed by (constituted by) the flexible part 62. The frame part 221 is formed by (constituted by), for example, the portion located outside the portion that is bent into an accordion shape. In this structure, the flexure part 222 is formed by (constituted by) the flexible part 62 and the pressure receiving surface 61.

Figure 12:
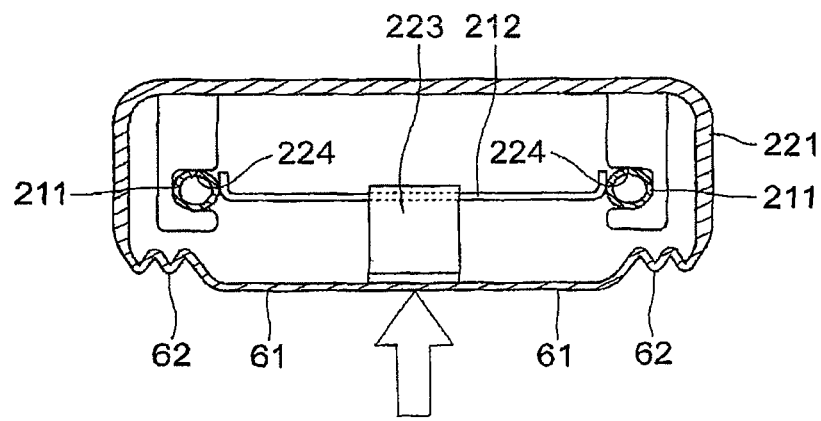
FIG. 12 is a sectional view showing the section taken along the line XII-XII of FIG. 11.
Figure 13:
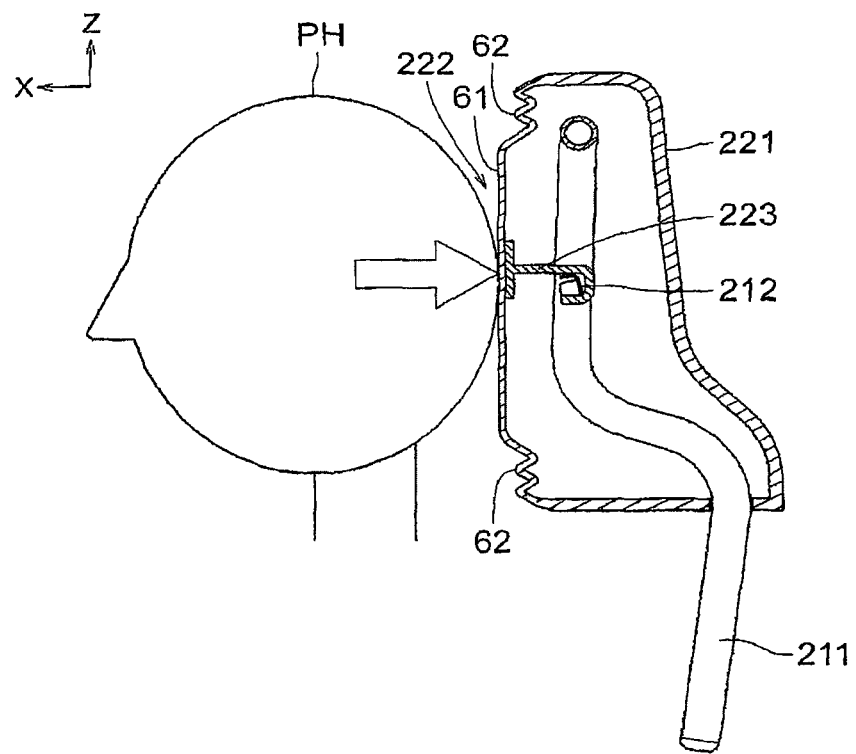
FIG. 13 is a sectional view showing the section taken along the line XIII-XIII of FIG. 11.

In Modified example 2, as shown in FIG. 12, the sliding portions 224 are formed by protruding a part of the frame part 221 inward from the back surface side. The engaging portion 223 is provided on the back surface side of the flexure part 222. The engaging portion 223 is engaged with the bracket 212 in order to restrain the sliding portions 224 from sliding relative to the headrest stay 211, as in the embodiment. Since this structure is employed, the engaging portion 223 can be disengaged from the bracket 212 when the head PH of the occupant presses the pressure receiving surface 61 with a load equal to or larger than a predetermined load in the direction indicated by the outlined arrows in FIG. 12 and FIG. 13.

Figure 14:
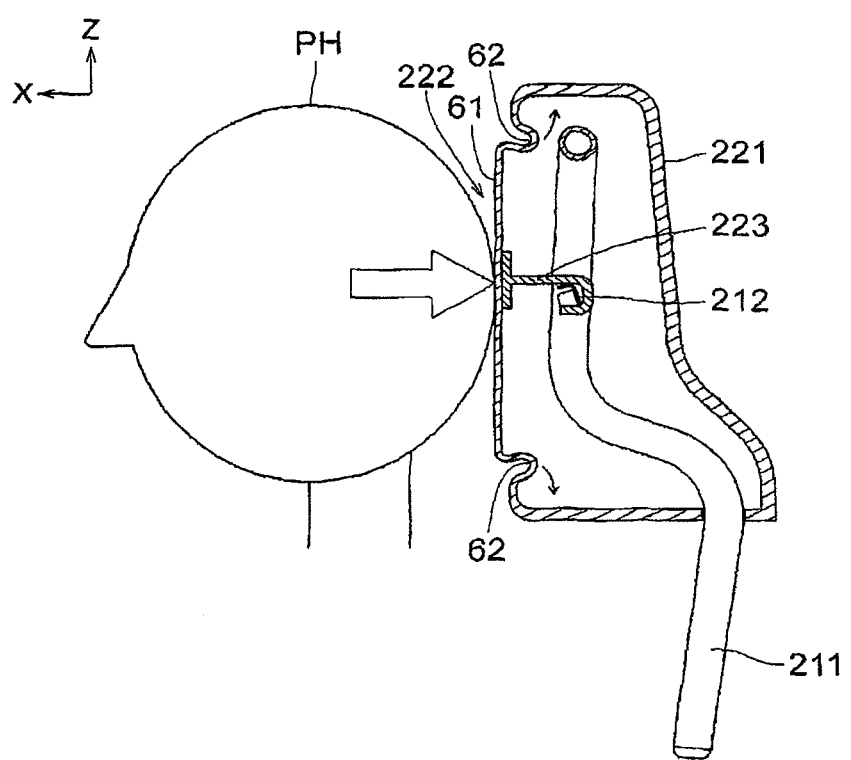
FIG. 14 is a longitudinal sectional view showing the structure of Modified example 2 in which the flexible part is substantially U-shaped in the sectional view.

Instead of employing the form of the flexible part 62 bent such that a plurality of ridges and valleys are continuous with each other like an accordion, it is also possible to couple the pressure receiving surface 61 with the flexible part 62 formed by (constituted by) a portion that is bent from a part of the frame part 221 toward the rear side and a portion that is bent toward the front side as shown in FIG. 14. In this case, the flexible part 62 can be substantially U-shaped, J-shaped, V-shaped, or the like in a sectional view. The flexible part 62 thus formed moves as indicated by the black arrows in FIG. 14 when the head PH of the occupant moves in the direction indicated by the outlined arrow, so that the flexure part 222 constituted by the flexible part 62 and the pressure receiving surface 61 bends.

Modified Example 3

Figure 15:
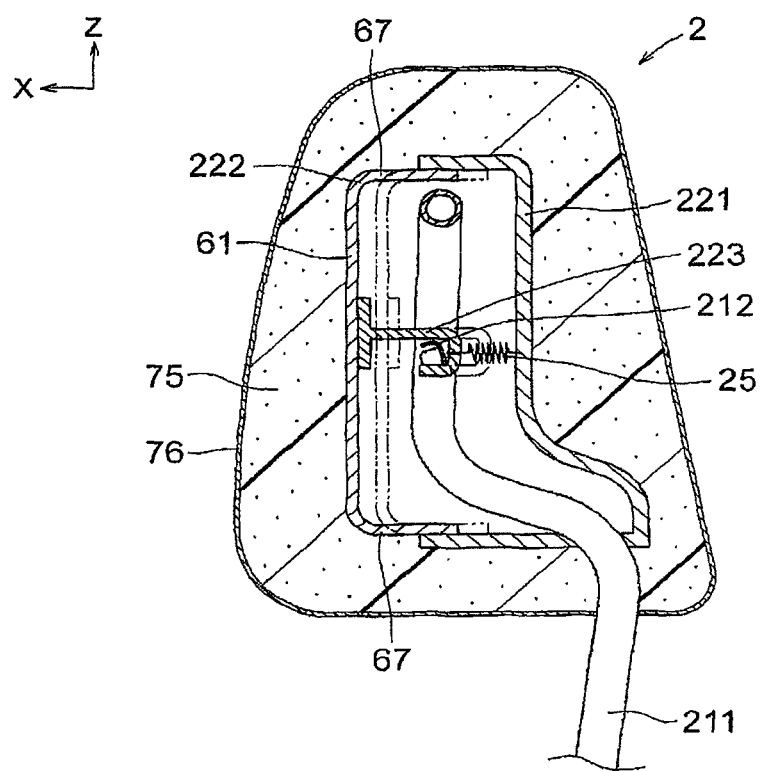
FIG. 15 is a longitudinal sectional view of a headrest of Modified example 3.
Figure 16:
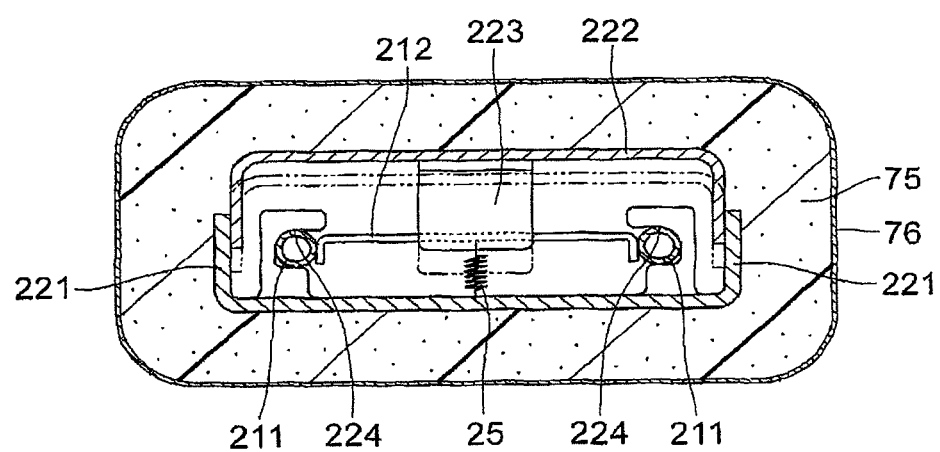
FIG. 16 is a lateral sectional view showing an engaging part and parts near the engaging part in the headrest of Modified example 3.

Modified example 3 has a feature that the frame part 221 supports the flexure part 222. Therefore, the following description will be focused on this feature. The other parts that will not be described in detail are generally the same as, for example, in the embodiment. In Modified example 3, the entire flexure part 222 is movable relative to the frame part 221. Therefore, the frame part 221 that has a recessed shape in a sectional view is disposed so as to cover the back surface side of the top part of the headrest stay 211 as shown in FIG. 15. The flexure part 222 is mounted so as to be slidable relative to this frame part 221. The flexure part 222 includes the pressure receiving surface 61 and a rim part 67 formed around the pressure receiving surface 61. The rim part 67 is slidable relative to the frame part 221 and is supported by the frame part 221. The flexure part 222, subjected to a load equal to or larger than a predetermined value from the head PH of the occupant, slides relative to the frame part 221 while bending, thereby moving rearward (see the two-dot chain line of FIG. 15 and FIG. 16). As the flexure part 222 moves toward the rear side while bending, the engaging portion 223 moves rearward. Accordingly, it is possible to disengage the engaging portion 223 from the bracket 212.

Even after the engaging portion 223 is disengaged from the bracket 212, the engaging portion 223 and the bracket 212 can engage with each other again. Specifically, the spring 25 is disposed to deliver an elastic force so as to move the flexure part 222 forward. The member for performing this function is not limited to the spring 25, and the similar function may be performed by using an elastic body such as rubber.

Although the present invention has been described above using the embodiment and some modified examples, the present invention can be implemented in various other forms. For example, the present invention is not limited to the configuration in which the movable member is movable from the initial position only to the upper side, and the movable member may be movable from, the initial position only to the lower side or movable from the initial position to both upper and lower sides. In the former case, for example, the direction of the hook that forms (constitutes) the engaging portion in the embodiment should be turned upside down, and a space should be secured that allows the movable member to move from the initial position to the lower side. In the latter case, for example, the bracket provided in the base member should be provided with a recessed-protruding portion that can engage with the hook, and the bracket should be disposed so as to extend in the upper-lower direction; and accordingly the direction of the hook should be turned 90 degrees from the direction in the embodiment and a space should be secured that allows the movable member to move upward and downward.

The longitudinal direction of the slit provided around the pressure receiving surface is not limited to the upper-lower direction, and may also be the right-left direction. More specifically, the flexible parts may be respectively disposed on the right and left sides of the pressure receiving surface and the slits may be respectively provided on the upper and lower sides of the pressure receiving surface. The slit may be provided such that the longitudinal direction of the slit is the oblique direction, and in that case, the flexible part may be provided such that the longitudinal direction of the flexible part is the oblique direction. The number of slits is not limited to two, and the number of the slits may be only one or three or more. Instead of the linear shape, the slit may also have a curved shape.

It is also possible employ a configuration in which the locking is secured when a deformable portion provided in the rear-side case engages with the bracket, and the locking can be released when a protrusion provided in the front-side case moves rearward by being subjected to a load from the head PH of the occupant and deforms the deformable portion. Since the spring connected with the base member and the movable member is not necessarily required, it can be omitted.

It is not necessarily required that the rear-side case should include the sliding portion, and the sliding portion may be included in the front-side case. Furthermore, it is also possible to employ a configuration in which the case part is not divided into the front side and the rear side. In this case, the sliding portion can be formed to have a cylindrical shape such as a substantially O-shape in a sectional view, instead of a substantially C-shape in a sectional view, by employing a configuration in which the case part is divided into upper and lower parts.

The material, of which the case part, the frame part, and the like, are formed, are not limited to resin described, for example, in the embodiment, and it is not necessarily required to form these parts using resin. These parts may be partly or entirely formed using a metal material.

It is not necessarily required that the lock mechanism should have a form in which the engaging portion and the bracket engage with each other. The lock mechanism may have a form in which the engaging portion and the headrest stay engage with each other. In this case, the engaging portion may engage with a portion that is located in the upper part of the headrest stay and extends substantially in the right-left direction.

Moreover, the conveyance, to which the present invention is applied, is not limited to a vehicle, and may be a conveyance that flies in the air, such as an airplane or a helicopter, or a conveyance that moves on the sea or under the sea, such as a ship or a submersible.

What is claimed is:

1. A movable headrest comprising:
a base member including a headrest stay;
a movable member that is slidable in at least one of an upward direction and a downward direction relative to the headrest stay; and
a lock mechanism that locks the movable member such that the movable member is restrained from sliding relative to the headrest stay, wherein:
the movable member includes a flexure part that bends due to a load received from a head of an occupant, a frame part that supports the flexure part, and an engaging portion that engages with the base member such that the movable member is locked; and
the frame part includes a sliding portion that slides relative to the headrest stay, and when the flexure part is bent such that the engaging portion is moved relative to the frame part, the movable member is unlocked.

2. The movable headrest according to claim 1, wherein rigidity of the sliding portion is higher than rigidity of the flexure part.

3. The movable headrest according to claim 1, further comprising
an urging part that urges the movable member toward an initial position, after the movable member is moved from the initial position.

4. The movable headrest according to claim 1, wherein the engaging portion is provided on a back surface side of the flexure part.

5. The movable headrest according to claim 1, wherein a part of the engaging portion is located inside the flexure part.

* * * * *